United States Patent [19]

Treffner et al.

[11] Patent Number: 4,695,416
[45] Date of Patent: Sep. 22, 1987

[54] METHOD AND APPARATUS FOR MOULD-FORMING EXPANDED PLASTICS FORM BLOCKS

[76] Inventors: Peter Treffner; Charles Treffner, both of 85 Grose Street, Parramatta, New South Wales, 2150, Australia

[21] Appl. No.: 784,884

[22] PCT Filed: Feb. 26, 1985

[86] PCT No.: PCT/AU85/00032
§ 371 Date: Oct. 1, 1985
§ 102(e) Date: Oct. 1, 1985

[87] PCT Pub. No.: WO 85/03903
PCT Pub. Date: Sep. 12, 1985

[30] Foreign Application Priority Data

Feb. 29, 1984 [AU] Australia .............................. PG3840

[51] Int. Cl.⁴ .............................................. C08J 9/22
[52] U.S. Cl. ...................................... 264/45.4; 264/53; 264/DIG. 15; 425/4 R
[58] Field of Search ................... 264/51, 53, DIG. 15; 425/4 C

[56] References Cited

U.S. PATENT DOCUMENTS

| | | | |
|---|---|---|---|
| 3,383,441 | 5/1968 | Norrhede et al. | 264/51 |
| 3,594,461 | 7/1971 | Jacob | 264/51 |
| 3,674,387 | 7/1972 | Gonon | 425/4 C |
| 3,830,604 | 8/1974 | Korpela | 264/51 X |
| 3,832,429 | 8/1974 | Charpentier | 264/51 |
| 4,539,167 | 9/1985 | Schedel | 264/51 |

FOREIGN PATENT DOCUMENTS 60468 3/1973 Australia .
1546153 5/1979 United Kingdom .
2137133 10/1984 United Kingdom .

OTHER PUBLICATIONS

*Whittington's Dictionary of Plastics,* by Lloyd R. Whittington, Stamford, Conn., Technomic, ©1968, Preface; pp. 59-60.

Primary Examiner—Philip Anderson
Attorney, Agent, or Firm—Stevens, Davis, Miller & Mosher

[57] ABSTRACT

A method of making an expanded plastics foam block section and uniting it with a prior made, or partly made, section comprising the steps of charging a mould space of which one end is defined by a surface of the prior section with expandable plastics beads, initiating the expansion and fusion of the beads to create a cohesive but largely unexpanded mass of beads, obtruding the prior section into the mould space to compress a zone of the cohesive mass adjacent to the said one end, increasing the temperature and pressure in the mould space to complete the expansion and fusion process and to compress the end zone of the prior section to bring its end substantially to its unobtruded position, lowering said pressure and temperature, and ejecting the newly made block section from the mould space.

Apparatus for performing the method is also disclosed.

8 Claims, 4 Drawing Figures

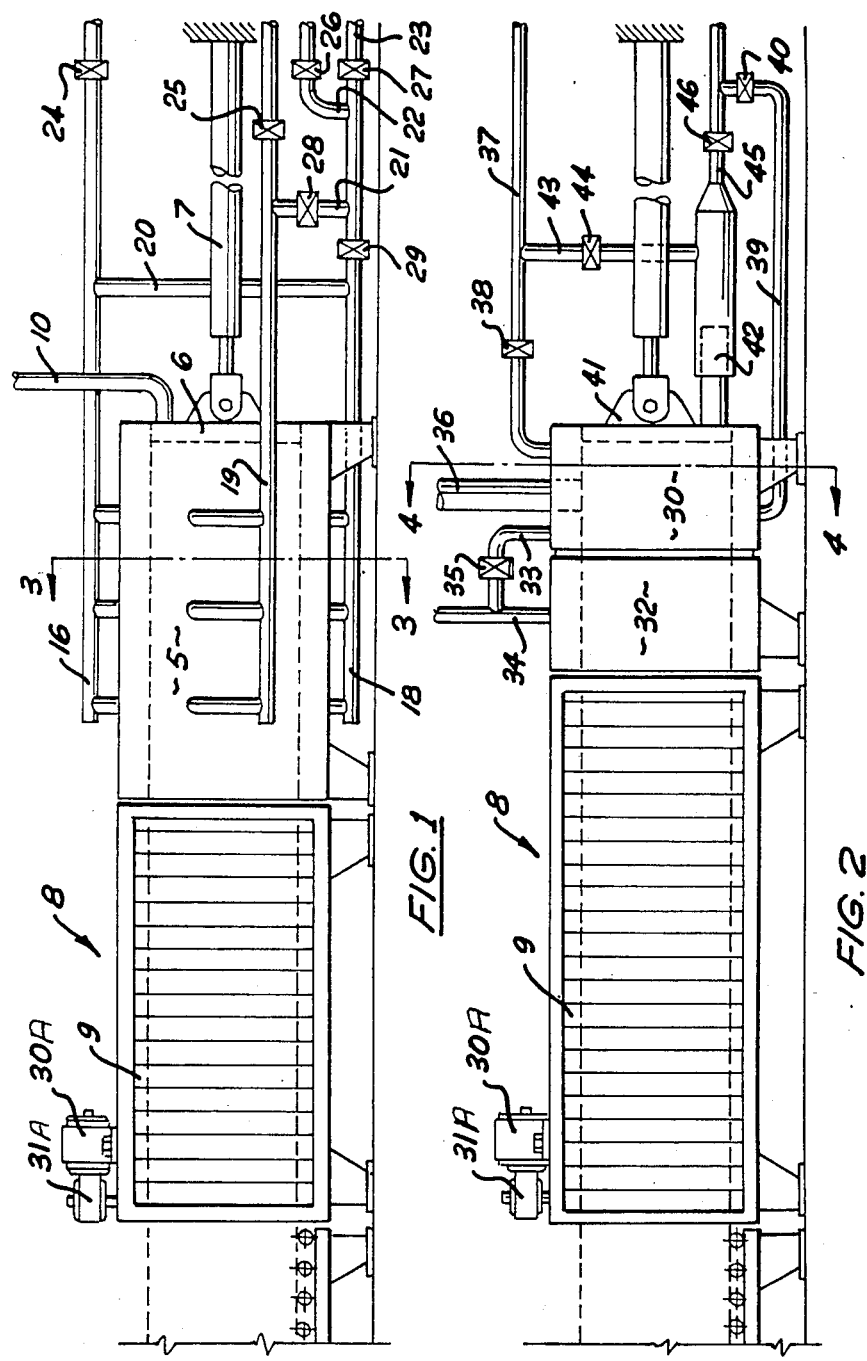

4,695,416

METHOD AND APPARATUS FOR MOULD-FORMING EXPANDED PLASTICS FORM BLOCKS

TECHNICAL FIELD

This invention relates to the production of large blocks of expanded plastics, for example, polystyrene, foam. The formed blocks are usually cut into sheets or other shapes to form finished articles.

BACKGROUND ART

Typically, such blocks are made by filling a mould with expandable polystyrene beads (EPS beads), blowing steam through the mould space until the beads start to react and expand, then closing the steam exhaust passage and allowing the steam pressure to build up to complete the expansion and fusion process and finally exhausting steam and condensate from the mould.

In conventional single mould machines the newly formed block has to remain in the mould until the internal pressure has dropped sufficiently to allow the mould to be opened and the block to be ejected without further swelling and consequent cracking of the block. This has limited the production rate per mould and of course the size of the block has also been limited by the size of the mould.

In order to overcome or ameliorate those limitations step-by-step continuous moulding has been proposed wherein the mould is in the form of an open-ended "tunnel", one end of which is closable by a longitudinally movable ejector wall and the other end of which opens into an open-ended curing "chamber", each side wall of which is defined by a flight of a flat plate segmented chain conveyor.

In using the last mentioned apparatus the EPS beads are charged into the steam tunnel and processed much as before with a previously formed block section in the curing chamber being relied upon to close the tunnel end remote from the ejector wall. The newly formed block section fuses with the section in the curing chamber and in due course the ejector wall pushes the new section into the curing chamber, a move which is facilitated by operation of that chamber's chain conveyors.

As the block section in the curing chamber is contained against substantial expansion the time required in the steaming tunnel is lessened and by step-by-step operation there is virtually no limit to the length of block ultimately produced.

Nevertheless step-by-step continuous moulding as presently practiced has shortcomings which have reduced its acceptability in the industry.

During the steaming stage the foam and steam pressure exert a considerable force onto the end of the previously formed section in the curing chamber to which the new section has to fuse to make a continuous block. As the previous section is then still relatively soft and resilient, that force compresses the foam and in effect the end of the previous section is moved along. At low pressures, this movement is of no great consequence. However, if the foam to be produced has to be well fused, higher foam and steam pressures are required and the "give" is quite considerable. This movement or "give" causes two problems. Firstly, it creates additional volume in the steaming tunnel which has to be filled by the original quantity of beads charged into the tunnel, so producing a zone of lower density foam at each join. Secondly, the movement itself does not allow the new section to fuse properly onto the previous section and poor fusion, especially close to the walls, spongy corners and crack marks are the consequence.

A relatively new technique for enhancing the fusion of expanded EPS beads in single block moulds is the evacuation of air from the mould space prior to steaming. If about 80%–90% of the air is removed from the mould, the in-flowing steam almost immediately penetrates through the whole bead mass and much more uniform expansion and fusion is achieved.

Unfortunately, in experiments leading to the present invention it was found that if such high evacuation is used in continuous step-by-step moulding it causes the end of the previous section held in the curing chamber to snap off at the end of the conveyor chains and to be sucked back into the steaming tunnel. Lower vacuum was found to be ineffective, and thus pre-evacuation of the mould is not practical, in continuous step-by-step moulding machines as previously known.

Therefore, notwithstanding their high production capacity, continuous step-by-step machines have hitherto been restricted in their use to the production of low grade, open grain foams for general insulation and concrete cavity fill purposes.

The present invention was devised to ameliorate the above indicated disability of continuous step-by-step block production.

DISCLOSURE OF THE INVENTION

The invention consists in a method of making an expanded plastics foam block section and uniting it with a prior made, or partly made, section comprising the steps of charging a mould space of which one end is defined by a surface of the prior section with expandable plastics beads, initiating the expansion and fusion of the beads to create a cohesive but largely unexpanded mass of beads, obtruding the prior section into the mould space to compress a zone of the cohesive mass adjacent to the said one end, increasing the temperature and pressure in the mould space to complete the expansion and fusion process and to compress the end zone of the prior section to bring its end substantially to its unobtruded position, lowering said pressure and temperature, and ejecting the newly made block section from the mould space.

The invention also extends to apparatus comprising means for effecting the respective steps of the method.

Thus the method of the invention is characterised by the step of obtruding the prior made section back into the mould space before completing the bead expansion and fusion therein and the apparatus of the invention is characterised by the reversability of the curing chamber conveyor chains enabling such obtrusion.

BRIEF DESCRIPTION OF THE DRAWINGS

By way of example an embodiment of the above described invention is described in more detail hereinafter with reference to the accompanying drawings.

FIG. 1 is a diagrammatic side elevation of a moulding apparatus according to the invention.

FIG. 2 is a view similar to FIG. 1 of another apparatus according to the invention.

DESCRIPTION OF EMBODIMENTS

The methods of the invention may be carried out utilising step-by-step moulding equipment which apart from one significant detail, namely reversability of the chain conveyor drive of its curing chamber, is largely conventional in nature.

Figure 3:
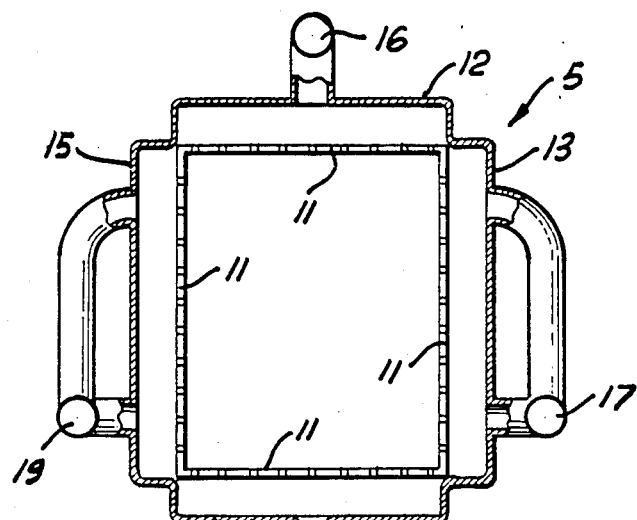
FIG. 3 is a diagrammatic sectional view taken on line 3—3 of FIG. 1.

Thus, with reference to FIGS. 1 and 3 such equipment may comprise a square or rectangular sectioned tunnel-like mould 5 closed at one end by an ejector wall 6 and opening at its other end into a correspondingly sectioned stabilizing chamber 8 having at least two opposite walls defined by flights of inter-linked slat type chain conveyors 9. The ejector wall 6 is movable into the mould 5 by an hydraulic thrustor 7 or other conventional means. Usual arrangements are provided for charging metered quantities of EPS beads into the mould 5 through an inlet duct 10.

The mould 5 has perforated inner walls 11 defining the mould space and surrounding jackets 12, 13, 14 and 15 respectively. The jacket interiors are connected to pipes 16, 17, 18 and 19 respectively. Pipes 16 and 18 are interconnected by pipe 20 and pipes 18 and 19 by pipe 21. Pipes 17 and 19 are also interconnected by a pipe (not shown) similarly placed to pipe 20. Pipes 16, 17 and 19 extend to a steam supply, whilst pipe 18 is connectable to a vacuum line 22 or is open to exhaust 23. Flow in various of the pipes is controlled by stop valves 24, 25, 26, 27, 28 and 29 respectively. Thus by appropriate operation of the valves the mould space may be steam heated, evacuated or exhausted through one or other of the walls 11 as required.

An essential difference between the apparatus of FIGS. 1 and 3 and prior known apparatus is that the drive, namely motor 30A and gear box 31A, to the conveyors 9 is reversible in direction to enable a prior formed block section to be both drawn from and returned into the mould space.

Another difference which is not essential to the invention but is greatly to be preffered is the flexibility of the piping and jacketing arrangements which not only enable the mould space to be evacuated but also enable steam to be fed into the mould space and exhausted therefrom through all four walls as selected whereas in conventional equipment steam entry is usually restricted to two opposed walls and exhaust to the other two.

The apparatus now being described may be used to effect a method according to the invention as follows. Assuming that a prior moulded block section is in the stabilizing chamber 8 (or, if plant start-up is involved, a block obtained elsewhere is placed therein), the first step is to charge the mould space with EPS beads through filler pipe 10 in usual manner.

Valves 24, 21 and 27 are then opened and valves 25, 29 and 26 closed to blow steam into jackets 12 and 14 and exhaust it from jackets 13 and 15. Thus steam is blown through the mould space, entering through the top and bottom walls 11 and departing through the side walls 11. If preferred the steam flow may in the reverse direction (in through the side walls and out through the top and bottom). This initial steaming, designated "pre-steaming" herein, is of brief duration. It suffices to displace most of the air from the voids between the loose beads and starts the expansion and fusion of the beads, especially adjacent to those of walls 11 through which the fresh steam enters. Steam flow is shut off at the end of this pre-steaming stage before the beads start to react strongly.

Once the pre-steaming is complete an intermediate evacuation stage is effected by closing valves 24, 25 and 27 and opening valves 21, 29 and 26. This cuts off the steam supply and connects all four jacket interiors to a vacuum source. For preference the vacuum source is a vacuum tank of sufficient size to lower the internal pressure in mould 5 to about half an atmosphere absolute in a few seconds. As the mould space is filled with hot steam and little residual air at the end of the pre-steaming stage such an evacuation of about 50% extracts nearly all of the air from the mould. At the same time the fact that the mould is initially filled with hot steam and condensate ensures that the pressure reduction is insufficient to tear the end from the prior moulded block section in chamber 8, as evaporating condensate keeps the vapour pressure in the mould space relatively high for a considerable time.

Immediately after, or preferably during, the intermediate evacuation stage the motor 30A is put into reverse drive and the conveyor walls 9 of chamber 8 operate to obtrude the prior moulded block section into the mould space by a predetermined amount. This is to compensate for the volume increase which will be created when the full pressure is subsequently built up. The obstrusion step must be effected after the pre-steaming stage because if it were done before then, the loose beads would move back into the mould without significant compression of individual beads; but as the pre-steaming causes light fusion of the beads together to create a cohesive mass, the obtrusion of the prior moulded block section compresses and end zone of that mass adjacent the prior moulded block section producing a zone at what eventually becomes the fused joint between the two sections of higher density than the density of the bead mass throughout the mould space as a whole. As the foam pressure rises during the main steaming stage, yet to be performed, the prior moulded block section is pushed from the mould space thereby to increase the effective space adjacent to the prior moulded block section, permitting the higher density zone to expand and producing a substantially even density throughout the final product.

It is a relatively simple matter to determine by trial and error testing the amount of return obtrusion of the prior moulded block section that is required for any particular operating conditions and desired product.

The main steaming stage follows. Thus valves 24, 21 and 26 are closed and valves 25, 29 and 27 opened to cut off the vacuum source, connect jackets 13 and 15 to the steam supply and connect jackets 12 and 14 to exhaust. Therefore steam flows into the mould space through both side walls 11 and exits through the top and bottom walls 11 as soon as the internal pressure reaches atmospheric. To prevent backflow, due to the internal pressure being below atmospheric for a period, the valve 27 is preferably a non-return valve. It will be noted that the direction of steam flow through the mould space is preferably in the opposite direction during the main steaming stage to its direction during the pre-steaming stage. This is preferred as it considerably evens out the expansion of the EPS beads throughout the mass of beads by reducing the fusion gradient.

When the beads have reacted sufficiently to commence substantial fusion and the foam pressure reaches a predetermined value all valves are closed to seal the mould space and allow residual steam therein to stabilise the foam and complete the fusion. Then the exhaust valve 27 is opened.

Once the internal mould pressure falls, to atmospheric the exhaust valve 27 is closed and valves 21, 29 and 26 opened to re-apply vacuum to remove residual steam, any condensate and free blowing agent. Thus, the foam pressure and temperature drop quickly and a relatively dry and stable block, section is produced.

As soon as foam pressure falls to a value at which the block section may be transferred to the stabilizing chamber 8 the ejector 6 is operated to push the new block section into the stabilizing chamber, at the same time the conveyors 9 are operated in the forward direction to assist by pulling at the same rate.

Once the freshly made block section is fully ejected, the ejector 6 is retracted, the mould space is thus reproduced and the cycle restarted.

Figure 4:
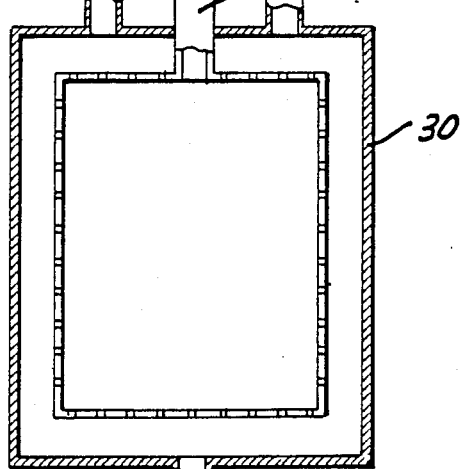
FIG. 4 is a view similar to FIG. 3 taken on line 4—4 of FIG. 2.

The apparatus of FIGS. 2 and 4 is similar in many respects to that of FIGS. 1 and 3 described above. The main differences are related to the mould jacketing and piping arrangements. In this instance the jackets are divided into a front jacket 30 which completely surrounds a front part of the mould 31 and a similarly constructed rear jacket 32 surrounding the remainder of the mould 31. Jackets 30 and 32 are separate from each other except for pipes 33 and 34 by which each may be simultaneously connected to a vacuum source. Pipe 33 includes valve 35 whereby jacket 30 may be isolated from jacket 32 and the vacuum source.

Mould 31 may be charged with beads through filler pipe 36.

The interior of jacket 30 may be connected to a steam supply by means of pipe 37 and valve 38. It may also be connected to exhaust by means of pipe 39 and valve 40.

An ejector wall 41 is also jacketed and is perforated to enable gas flow between the interior of its jacket and the mould space. The interior of the ejector wall jacket may be connected to the steam supply by a sliding gland 42, pipe 43 and valve 44. It may also be connected to exhaust by the gland 42, pipe 45 and valve 46.

This embodiment may be operated in a manner similar to that of the FIG. 1 embodiment to effect the method of the invention. The main difference is that the block section being moulded is moved through the mould space in two stages.

As before an empty mould space, this time substantially coincident with the mould space surrounded by the front jacket 30, is filled with EPS beads. Pre-steaming is effected by blowing steam, say through the ejector 41, through the bead mass and jacket 30 to exhaust. That is to say by opening valves 44 and 40, while the others are all closed. Following the pre-steaming, the intermediate evacuation stage is effected (valve 35 open, all others closed), then the obtrusion step characteristic of the invention is effected, followed by the main steaming stage (valves 38 and 46 open, the others closed). Preferably the front part of the mould is briefly evacuated (valve 35 open all others closed and the ejector and conveyors operated to shift the newly formed block, section into the rear part of the mould. While that front part is being refilled for the start of the next cycle the block section in the rear part of the mould is subjected to the full vacuum cooling and stabilisation process.

This method of moving the semi-stable block section into a rear part of the mould space for the vacuum cooling stage increases the cycling speed and compensates for the short stroke of the ejector. As the newly fully steamed section is fused to a hot, still resilient, face even better interface fusion and less density variation is achievable by comparison with earlier described embodiments wherein the entirety of each charge is steamed and cooled in one and the same mould space.

Furthermore, the fact that steam enters the mould space through the ejector wall coupled with the short stroke enables the steam to penetrate readily to the core of the bead mass being steamed. This, in turn, enables the cross sectional dimensions of the block to be increased very considerably beyond what was previously possible with side wall steam entry alone. It should be stated that in any practical installation there is likely to be design variations in the piping and valve arrangements. There will also be varying degrees of sophistication in the control means utilised ranging from all manual control to fully automatic operation under the control of a programmable microprocessor, but as such details are conventional they require no detailed description herein. Likewise it should be pointed out that the mechanisms used for individual parts of the apparatus may differ from those illustrated, in particular the transporter means for shifting the cured block along the curing chamber may taken any known or appropriate form provided that, in accordance with the invention they are reversible in action.

The claims defining the invention are as follows:

We claim:

1. In a method of making an expanded plastics foam block section and uniting it with a prior made or partly made section comprising the steps of charging a mould space of which one end is defined by a surface of the prior section with expandable plastics beads, and initiating the expansion and fusion of the beads to create a cohesive but largely unexpanded mass of beads, the improvement comprising obtruding the prior section into the mould space to compress a zone of the cohesive mass adjacent to the said end of the space, increasing the temperature and pressure in the mould space to complete the expansion and fusion process and to compress an end zone of the prior section to bring its end substantially to its unobtruded position, lowering said pressure and temperature, and then ejecting the newly made block section from the mould space.

2. A method according to claim 1 wherein said initiating step is effected by flowing steam through the mould space.

3. A method according to claim 2 wherein said increasing step is effected by admitting steam into the mould space.

4. A method according to claim 1 wherein the newly made block section is ejected from the mould space while still warm and unstabilised and thereafter the section is further cooled and stabilised at below atmospheric pressure while it is functioning to define said one end of the mould space.

5. A method according to any one of claims 1 to 3 wherein said lowering step is continued until the newly made block section is sufficiently stabilized to be ejected directly into a stabilizing chamber adjacent the mould space to complete the stabilization of the block section.

6. In an apparatus for carrying out a method according to claim 1, comprising a jacketted tunnel defining a mould space, an ejector wall closing one end of the tunnel, a stabilizing chamber being a continuation of the other end of the tunnel and having transporter means therein whereby a shaped block section in the chamber may be shifted therethrough, and means to supply steam into, to exhaust and to evacuate said mould space; the improvement comprising said stabilizing chamber transporter means being reversible to enable them to obtrude a shaped block section into said mould subsequent to its ejection therefrom.

7. Apparatus according to claim 6 wherein said ejector wall is jacketed and wherein said means to supply include means to supply steam into said mould space through said ejector wall.

8. Apparatus according to claim 6 wherein said transporter means comprise slat chain conveyors defining at least two opposite walls of said chamber.

* * * * *